United States Patent
Linzer

(10) Patent No.: US 7,499,493 B2
(45) Date of Patent: Mar. 3, 2009

(54) DUAL BLOCK MOTION VECTOR STORAGE IN COMPRESSED FORM

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 911 days.

(21) Appl. No.: 10/600,079

(22) Filed: Jun. 20, 2003

(65) Prior Publication Data
US 2004/0258153 A1 Dec. 23, 2004

(51) Int. Cl.
*H04N 7/18* (2006.01)
(52) U.S. Cl. ............... 375/240.16; 375/240.17; 375/240.12; 375/240.14; 375/240.15
(58) Field of Classification Search ............... 375/240.01–240.29
See application file for complete search history.

(56) References Cited

U.S. PATENT DOCUMENTS 5,701,164 A * 12/1997 Kato ............... 348/699
5,739,862 A * 4/1998 Cen ............... 375/240.15
2004/0066848 A1* 4/2004 Jeon ............... 375/240.15
2004/0240559 A1* 12/2004 Prakasam et al. ...... 375/240.25

OTHER PUBLICATIONS

Thomas Wiegand, Gary Sullivan, Ajay Luthra, Draft ITU-T Recommendation and Final Draft International Standard of Joint Video Specification (ITU-T Rec. H.264| ISO/IEC 14496-10 AVC), May 29, 2003.
Thomas Wiegand, Gary Sullivan, Draft ITU-T Recommendation and Final Draft International Standard of Joint Video Specification (ITU-T Rec. H.264 | ISO/IEC 14496-10 AVC), Apr. 2, 2003.
Thomas Wiegand, Editor's Proposed Draft Text Modification for Joint Video Specification (ITU-T Rec. H.264 | ISO/IEC 14496-10 AVC), Draft 7, Sep. 19, 2002.

* cited by examiner

*Primary Examiner*—Andy S Rao
(74) *Attorney, Agent, or Firm*—Christopher P. Maiorana, PC

(57) ABSTRACT

A method for representing a motion for two blocks. The method generally includes the steps of (A) exchanging a particular value of a plurality of values with a memory, each of the values defining which of the two blocks use which of a plurality of motion vectors based upon one of a plurality of prediction types and (B) representing the motion for the two blocks with a group comprising the particular value and up to all of the motion vectors.

25 Claims, 4 Drawing Sheets

US 7,499,493 B2

DUAL BLOCK MOTION VECTOR STORAGE IN COMPRESSED FORM

FIELD OF THE INVENTION

The present invention relates to motion vectors generally and, more particularly, to dual block motion vector storage in a compressed form.

BACKGROUND OF THE INVENTION

Compression of digital video data is used for many applications including transmission over bandwidth-constrained channels, such as direct broadcast satellite and storage on optical media. In order to achieve more efficient compression, complex computationally intensive processes are used for encoding (compressing) and decoding (decompressing) video. For example, although MPEG-2 is known as a very efficient method for compressing video, some new, more efficient standards (i.e., "Advanced Video Coding" standard H.264 published by the International Telecommunication Union Telecommunication Standardization Sector, Geneva, Switzerland) are being developed.

In the H.264 standard, a macroblock represents a 16 horizontal (H) by 16 vertical (V) array of pixels having 16 H×16V luminance samples and 8 H×8V each of Cb and Cr chrominance samples. Referring to FIG. 1, when macroblock adaptive field/frame coding is used, macroblocks are coded in vertically adjacent pairs that comprise an array of 16 H×32V pixels 10 (i.e., 16 H×32V luminance samples and 8 H×16V each of Cb and Cr chrominance samples) from a frame. Each macroblock pair 10 is coded either as two frame macroblocks 12a-b (i.e., two sets of vertically adjacent 16 H×16V pixels from the frame) or as two field macroblocks 14a-b (i.e., one set from each of two fields of 16 H×16V pixels).

Hereafter the notation "macroblock (pair)" is used to mean (i) a single macroblock if macroblock adaptive field/frame coding is not used and (ii) a macroblock pair if macroblock adaptive field/frame coding is used. The H.264 standard defines storing motion vectors for decoded macroblocks (pairs) for use in decoding other macroblocks (pairs). Specifically, to reconstruct the motion vectors for a current macroblock (pair) a decoder uses one of two sets of motion vectors. The first set involves motion vectors from neighboring macroblocks (pairs) in a current picture. Referring to FIG. 2, the first set of constructed motion vectors for the current macroblock (pair) 18 includes motion vectors for a macroblock (pair) 20 to the left, motion vectors for a macroblock (pair) 22 above and motion vectors for a macroblock (pair) 24 above and to the right. A second set of constructed motion vectors involves co-located motion vectors in a different picture (i.e., the motion vectors from a macroblock (pair) in the same position as the current macroblock (pair) 18 but in a different picture.) Typically, a decoder embodied in an integrated circuit (IC) would use a small data cache to hold the motion vectors for one row of macroblock (pairs) for the neighbor macroblocks (pairs) in the same picture to reduce the data written to and read from an external memory, where the cache holds one macroblock (pair) row of vectors. However, the motion vectors retained for future use, such as co-located motion vectors, are typically stored to the external memory and consume considerable storage space. Unfortunately, storing or caching large numbers of motion vectors increases a cost of a decoding or encoding system. The external memories and/or internal caches are commonly large circuits to hold all of the motion vector data. Furthermore, the external memory devices are often implemented with high speed technology to maintain sufficient data transfer rates.

SUMMARY OF THE INVENTION

The present invention concerns a method for representing a motion for two blocks. The method generally comprises the steps of (A) exchanging a particular value of a plurality of values with a memory, each of the values defining which of the two blocks use which of a plurality of motion vectors based upon one of a plurality of prediction types and (B) representing the motion for the two blocks with a group comprising the particular value and up to all of the motion vectors.

The objects, features and advantages of the present invention include providing dual block motion vector storage method and/or architecture that may (i) provide a compact method for storing motion data for later use as neighbor motion or co-located motion vectors, (ii) store motion vector information with less space (e.g., fewer bytes) than conventional methods, (iii) reduce a cost of an encoder and/or a decoder as compared with conventional implementations, (iv) reduce a size of external memories as compared with conventional encoders or decoders, (v) reduce a size of cache memories as compared with conventional designs and/or (vi) operate with a lower speed external memory than conventional implementations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
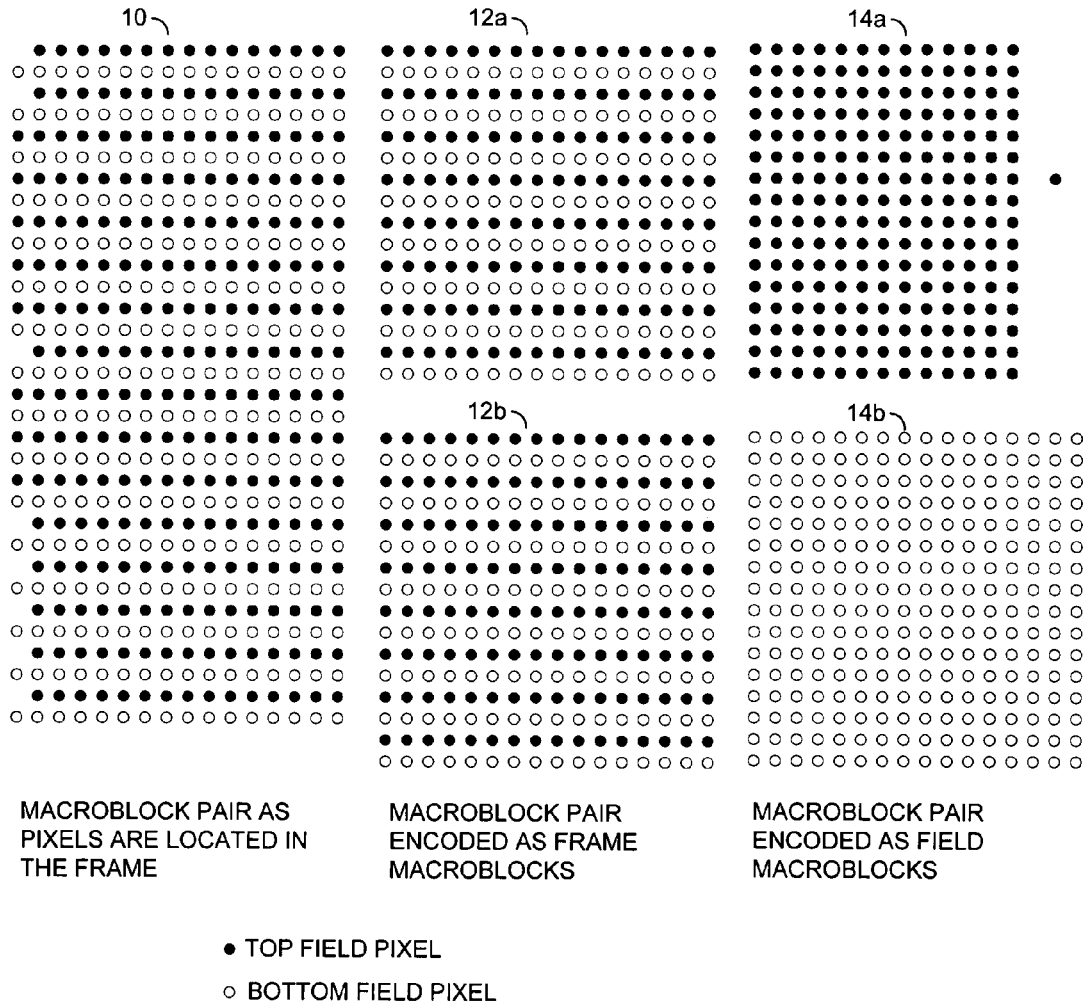
FIG. 1 is a block diagram of a conventional macroblock pair.
Figure 2:
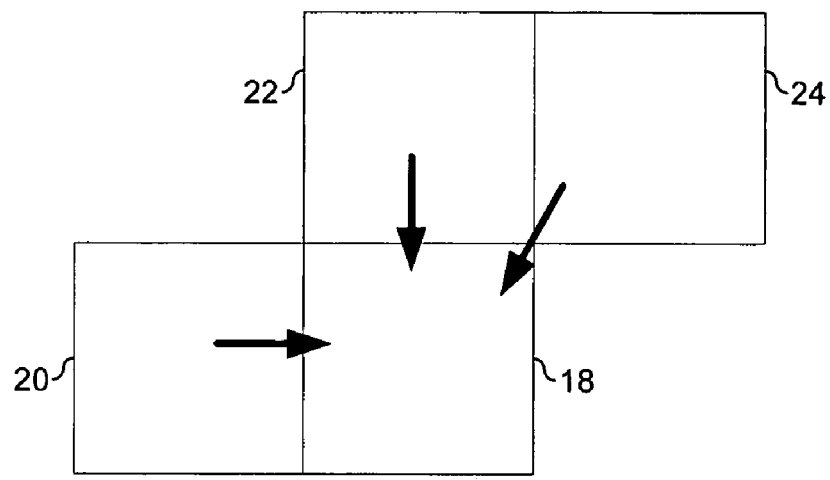
FIG. 2 is a block diagram illustrating using neighboring motion vectors to generate a predicted motion vector.

The H.264 standard generally provides that a motion vector may cover a region (e.g., macroblock, macroblock partition and macroblock sub-partition) of any one of several different sizes. The sizes may include 16H×16V, 8 H×16V, 16 H×8 V, 8 H×8V, 4 H×8V, 8 H×4V and 4 H×4V pixel regions. Moreover, every region may have zero, one or two motion vectors. For intra region prediction, no motion vectors may be defined. For single direction prediction, a list 0 (e.g., L0) motion vector or a list 1 (e.g., L1) motion vector may be defined. Bidirectional prediction generally includes both an L0 and an L1 motion vector for each region.

To reconstruct motion vectors in a given macroblock (pair), a decoder may utilize the L0 and L1 motion vectors in 4×4 blocks that neighbor the macroblock (pair). If macroblock adaptive field/frame coding is not used, a decoder generally uses several sources of information to reconstruct the motion vectors in a given macroblock. A first source of motion information may be the motion vectors in the four left 4×4 blocks immediately to the left of the given macroblock. The four left 4×4 blocks may have up to eight motion vectors total. A second source of motion information may be the motion vectors in the four additional 4×4 blocks immediately above the given macroblock. The four above 4×4 blocks may have up to eight additional motion vectors. A third source of motion information may be the motion vectors in the single 4×4 block immediately above and to the right of the given macroblock. The single 4×4 block may contribute up to two motion vectors. A conventional decoder (or encoder) will store two vectors for every 4×4 block on a macroblock row and eight vectors (two each for the four 4×4 blocks) from the macroblock to the left. The total number of motion vectors stored is generally 8+8*Y, where Y is the width of the picture in units of macroblocks.

If macroblock adaptive field/frame coding is used, a decoder may use several motion vectors from neighboring blocks to reconstruct the motion vectors in a given macroblock pair. The decoder may use the motion vectors in eight 4×4 blocks immediately to the left of the given macroblock pair. The eight left 4×4 blocks may define up to sixteen motion vectors. The following motion vectors from the above macroblock pair may be used: if the above pair uses frame coding, the motion vectors from the bottom four 4×4 blocks of the bottom macroblock of the above pair may be used; else (field coding is used) the motion vectors from the bottom four 4×4 block of each macroblock of the above pair may be used. Therefore, motion vectors from up to eight 4×4 block may be used (e.g., when the above macroblock pair uses field encoding). The eight upper 4×4 blocks may contribute up to sixteen vectors. The motion vectors in a single 4×4 block immediately above and to the right of the given macroblock pair in each field may also be considered. The single 4×4 block may have up to four motion vectors when the given macroblock pair above is coded in field mode. A conventional decoder (or encoder) will store two vectors for every 4×4 block on a macroblock pair row from each field and sixteen vectors (two each for the eight 4×4 blocks) from the macroblock pair to the left. The total number of motion vectors stored may be 16+16*Y, where Y is the width of the picture in units of macroblocks.

Figure 3:
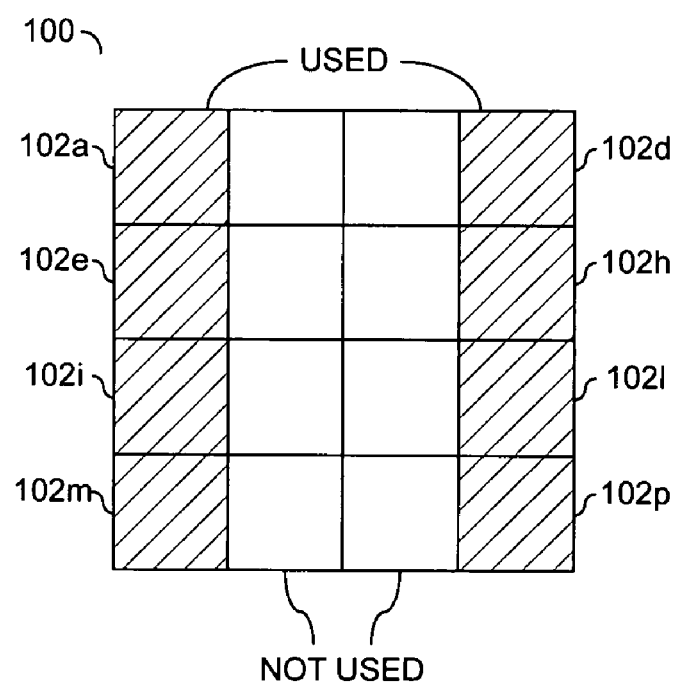
FIG. 3 is a block diagram of a macroblock having several adjoining sub-partitions.

Referring to FIG. 3, a block diagram of a macroblock 100 having several adjoining sub-partitions 102a-p is shown. In general, two motion vectors (e.g., L0 and L1) for every 4×4 block may be used from co-located macroblocks (pairs) (e.g., same macroblock (pair) in a different picture) in order to reconstruct the motion vectors in a given macroblock (pair). However, for the H.264 standard Main Profile levels 3 (e.g., standard definition television) and higher (e.g., high definition television, 720 line progressive scan, 1080 line interlaced scan and other high resolution pictures), the motion vectors for the left and right vertical edge of each 4×4 block may be utilized and the central 4×4 blocks may be ignored. For example, the motion vectors for the macroblock sub-partitions or blocks 102a, 102e, 102i and 102m along the left edge and 102d, 102h, 102l and 102p along the right edge may be stored, encoded and transmitted for use by a decoder. Therefore, for levels 3 and higher, sixteen motion vectors may be defined for the macroblock 100.

The H.264 standard generally restricts the way motion vectors may be used for Main Profile levels 3.1 and higher streams. Specifically, for each 8×8 quadrant in a macroblock, the 4×4 blocks may either (i) all use the same L0 and L1 motion vectors, (ii) use L0 prediction, (iii) use L1 prediction, or (iv) be coded as intra prediction. Thus, if bidirectional prediction is used for an 8×8 quadrant of a macroblock, all four 4×4 blocks within the 8×8 quadrant may use the same L0 and L1 vectors, although the L0 and L1 vectors may differ from each other.

In order to represent all possible motion vectors in a 4×4 region, two motion vectors may be operational even for levels 3.1 and higher, because bidirectional (L0 and L1) motion vectors may exist. For levels 3.1 and higher, two 4×4 blocks in the same 8×8 quadrant may use at most two unique motion vectors per the above description (e.g., a first set of two motion vectors for a particular 4×4 block may be the same as a second set of two motion vectors for an adjacent 4×4 block and thus redundant). The present invention generally represents all of the motion vectors in the two 4×4 blocks in the same 8×8 quadrant using a group having up to two motion vectors and two bits (e.g., BitL0 and BitL1). The set of redundant motion vectors may thus be excluded from the group. The bits BitL0 and BitL1 may define a variable (or parameter) conveying a meaning or interpretation for how to use the two motion vectors in the group. An example set of meanings allocated among the different values for the bits BitL0 and BitL1 is generally illustrated by TABLE I as follows:

TABLE I

| BitL0 | BitL1 | Meaning |
|---|---|---|
| 0 | 0 | Intra prediction may be used (no motion vectors). |
| 0 | 1 | L1 prediction may be used. The first motion vector may be for a first block and the second motion vector may be for a second block. |
| 1 | 0 | L0 prediction may be used. The first motion vector may be for a first block and the second motion vector may be for a second block. |
| 1 | 1 | Bidirectional prediction may be used. The first motion vector may be for the L0 vector (both blocks) and the second motion vector may be used for the L1 vector (both blocks). |

Although two motion vectors may be implemented for the two blocks, instead of four motion vectors, the stored information may be completely determined for each block based on the prediction type (e.g., none, L0 alone, L1 alone or L0 and L1 together).

The above approach may be used for horizontally adjacent 4×4 blocks in the same 8×8 quadrant. In the horizontally adjacent case, the "first" block may be identified as the block on the left and the "second" block may be identified as the block on the right. By storing the "above" row of neighbor motion vectors using the above method, only four motion vectors and four bits may be stored for every macroblock if macroblock adaptive field/frame coding is not used (e.g., a total of Y*4 motion vectors and Y*4 bits are stored for the above row.) If macroblock adaptive field/frame coding is used, eight motion vectors and eight bits may be identified per macroblock (pair) so that Y*8 motion vectors and Y*8 bits may be stored for the above row.

The above method may also be used for vertically adjacent 4×4 blocks in the same 8×8 quadrant. In the vertically adjacent case, the "first" block may be identified as the block on top and the "second" block may be identified as the block on the bottom. By storing the "left" neighbor motion vectors with the above method, only four motion vectors (and four bits) may be stored if macroblock adaptive field/frame coding is not used (e.g., a total of four motion vectors and four bits may be used for the left macroblock.) If macroblock adaptive field/frame coding is used, eight motion vectors and eight bits may be stored per macroblock (pair), so that eight motion vectors and eight bits may be utilized for the left pair.

By storing the above motion vectors using horizontally adjacent 4×4 blocks for the row above and vertically adjacent 4×4 blocks for the macroblock to the left, Y*4+4 motion vectors and Y*4+4 bits may be sufficient for all of the neighbor motion vectors if macroblock adaptive field/frame coding is not used. By storing above motion vectors using horizontally adjacent 4×4 blocks for the row above and vertically adjacent 4×4 blocks for the macroblock (pair) to the left, Y*8+8 motion vectors and Y*8+8 bits are generally sufficient for all of the neighbor motion vectors if macroblock adaptive field/frame coding is used.

Figure 4:
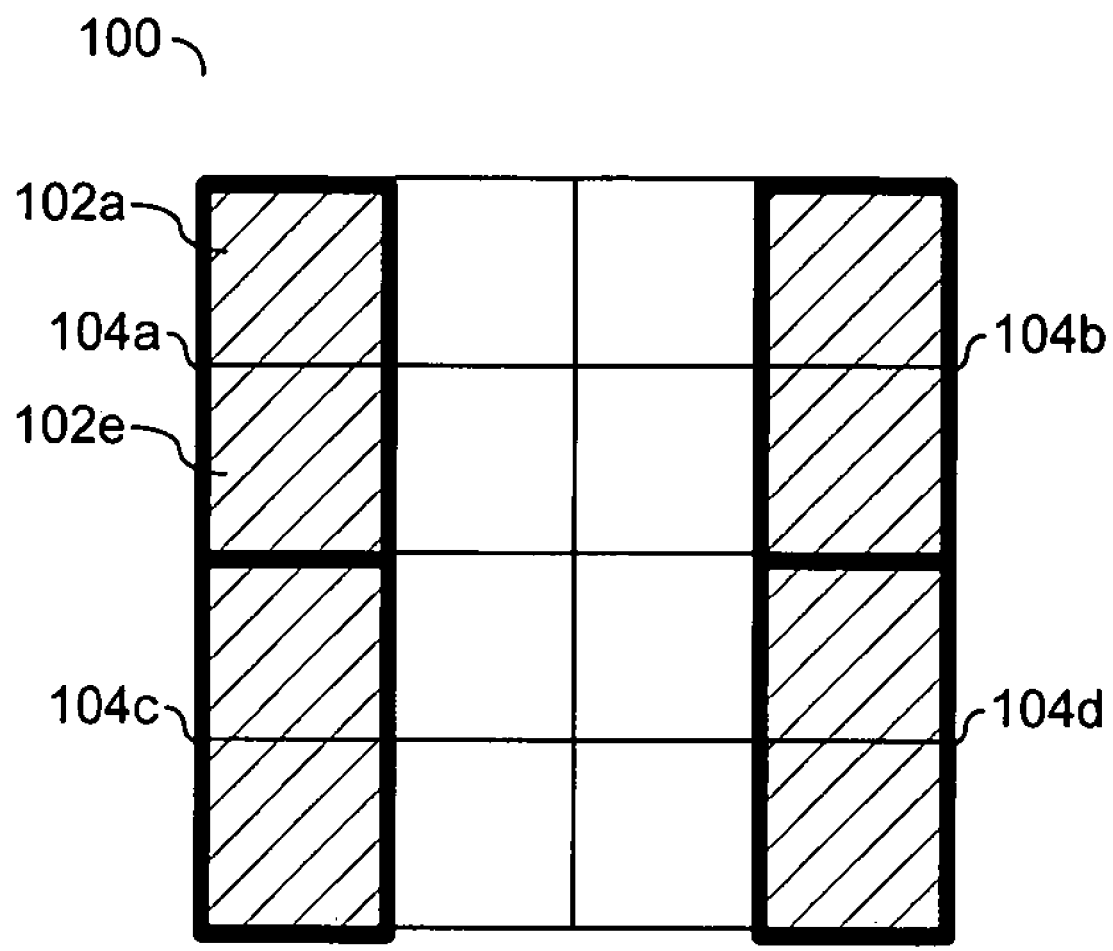
FIG. 4 is a block diagram of the macroblock from FIG. 3 having four regions.

Referring to FIG. 4, a block diagram of the macroblock 100 from FIG. 3 is shown having four regions. Considering the vertically adjacent 4×4 block case, the useful co-located motion vectors for the macroblock 100 are generally available from the four regions or groups 104a-d of vertically adjacent 4×4 blocks 102a-p. Each group 104a-d of 4×4 block pairs may be represented by two motion vectors and two bits. Therefore, the macroblock 100 may have a total of eight motion vectors and eight bits. Under a conventional approach, the macroblock 100 would have two motion vectors per 4×4 block 102a-p for a total of thirty-two motion vectors for storage in a cache memory or external memory. Storing only eight motion vectors and eight additional bits per macroblock 100 generally consumes substantially less memory space than the conventional approach.

The use of the eight motion vectors may be determined by the values of the eight bits. For example, in group 104a, while the two-bit meaning value defines a bidirectional prediction, the two motion vectors for group 104a may apply to both 4×4 blocks 102a and 102e. While the two-bit meaning value defines a directional prediction, one of the motion vectors may be applied to the top 4×4 block 102a and the other motion vector may be applied to the bottom 4×4 block 102e.

A fixed method to represent a single motion vector that ensures that the motion vector will be compressed when compared with a conventional direct method of representing the motion vector generally does not exist. For example, in the H.264 standard Level 3.1, a vertical component of a motion vector is generally in a range of [−512, 511.75] in ¼ pixel resolution (e.g., any integer divided by four that may fall in a range of [−512, 511.75] inclusive). The horizontal component of the motion vector is generally in a range [−2048, 2047.75] in ¼ pixel resolution (e.g., any integer divided by four that may fall in the range [−2048, 2047.75] inclusive). Thus, the vertical component may have 12 bits and the horizontal component may have 14 bits, resulting in at least 26 bits for each entire motion vector. While on average, fewer than 26 bits may be used to represent each motion vector, no method exists that will always use fewer than 26 bits since there are $2^{26}$ unique and legal possible vectors for each motion vector. An additional bit may be included for each motion vector to indicate if the motion vector is to be used or not for a total of 27 bits per motion vector and 54 bits per block.

Under the present invention, motion for a 4×4 block pair that may be encoded using (i) an L0 motion vector, (ii) an L0 motion vector, (iii) both an L0 or L0 motion vector or (iv) neither an L0 nor an L0 motion vector may be represented by at least two bits (e.g., BitL0 and BitL1) to indicate which of the four encoding methods is used. Therefore, to represent a particular method (e.g., intra, L0, L1 or bidirectional) and the two motion vectors used for two 4×4 blocks, at least 26*2+2=54 bits may be generated. By comparison, using a conventional method would generate at least 54+54=108 bits to represent the particular method (e.g., intra, L0, L1 or Bidirectional) and the four motion vectors used in two 4×4 blocks.

Each vector can take one of $2^{26}$ (67,108,864) unique values, and therefore any binary representation of a single vector uses at least 26 bits. Representing any four vectors that can each take on up to 67,108,864 unique values would use at least 4*26=104 bits. In general, to represent the motion vectors and methods for two blocks, where a first motion vector for a first block may have U1 unique values (e.g., directions and distances), a second motion vector for the first block may have U2 unique values, a third motion vector for a second block may have U3 unique values and a fourth motion vector for the second block may have U4 unique values, conventional methods use ceiling (log2(U1*U2*U3*U4)) bits rounded up to a nearest integer. In a specific embodiment where each motion vector may take on any of the same U unique values, conventional methods use ceiling (log2(U))*4 bits. For comparison, the present invention generally uses ceiling (log2(U))*2+2 bits in a binary representation.

A level N decoder may be capable of decoding data streams for all levels M<N. Therefore, a level 3.1 or higher decoder may also be capable of decoding data streams for levels lower than 3.1. Similarly, an encoder that encodes data streams for levels 3.1 and higher may also compress streams conforming to lower levels.

In one embodiment, a decoder (or encoder) may use the above motion vector compression method for levels 3.1 and higher and use conventional methods for the lower levels. Even though the conventional methods will generally use more storage and/or more bandwidth per macroblock than the present invention, a total amount of storage and bandwidth consumed (and therefore a cost of the encoding or decoding system) may be determined by the highest level that the decoder (or encoder) supports. A reason may be that a higher level bitstream may use bigger pictures and more macroblocks per second than a lower level bitstream. Thus, even a decoder or an encoder that only uses the motion vector compression of the present invention part time may derive benefits as if the motion vector compression method was used always.

Figure 5:
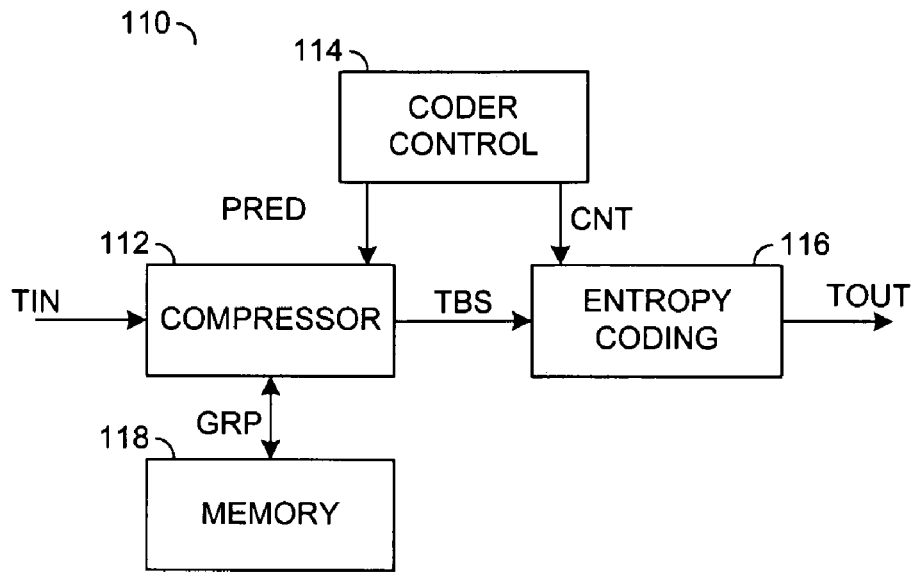
FIG. 5 is a partial block diagram of an encoder apparatus illustrating an example implementation in accordance with a preferred embodiment of the present invention.

Referring to FIG. 5, a partial block diagram of an encoder apparatus 110 illustrating an example implementation in accordance with a preferred embodiment of the present invention is shown. The encoder apparatus 110 may be implemented as a video bitstream encoder apparatus or system. The encoder apparatus 110 generally comprises a circuit 112, a circuit 114, a circuit 116 and a memory 118. The circuit 112 may receive a bitstream or signal (e.g., TIN). A bitstream or signal (e.g., TOUT) may be generated by the circuit 116.

The circuit 112 may be implemented as a compression circuit or module. The compression circuit 112 may be operational to compress the motion vectors for two adjacent macroblocks (pairs), partitions (e.g., quadrants) or sub-partitions (e.g., blocks) within the signal TIN. Compression may be determined by a signal (e.g., PRED) received from the circuit 114. A signal (e.g., GRP) may exchange data for the groups between the compression circuit 112 and the memory 118.

The circuit 114 may be implemented as a code control circuit. The circuit 114 may generate the signal PRED conveying the prediction type used by the macroblocks. The code control circuit 114 may also generate a signal (e.g., CNT). The signal CNT may provide coding controls to the circuit 116.

The circuit 116 may be implemented as a coding circuit. In one embodiment, the coding circuit 116 may be an entropy coding circuit. The entropy coding circuit 116 may receive the macroblocks and the associated groups of motion vectors and meaning values from the compression circuit 112 via a bitstream or signal (e.g., TBS). The entropy coding circuit 116 may be configured to encode the signal TBS to generate the signal TOUT for transmission and/or storage. In one embodiment, the signal TOUT may be implemented as a Network Abstraction Layer defined by the H.264 standard.

The memory 118 may be implemented as a cache memory and/or an external memory. The memory 118 is generally operational to store the motion vectors and respective meaning values for the macroblocks while the macroblocks are being encoded. The memory 118 may be configured to store other data used for encoding the bitstream data. Other types of memories may be implemented to meet the criteria of a particular application.

Figure 6:
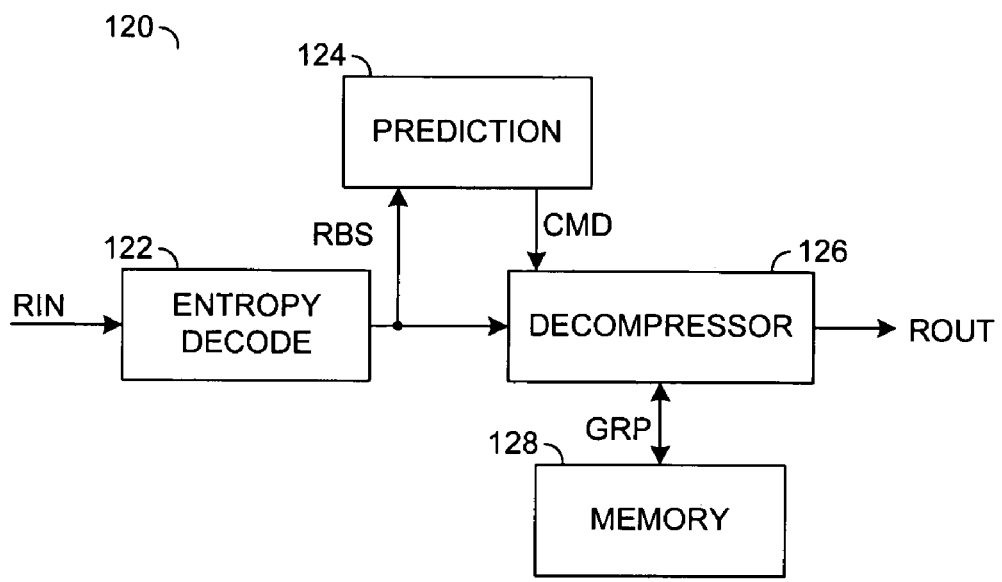
FIG. 6 is a partial block diagram of a decoder apparatus illustrating an example implementation in accordance with a preferred embodiment of the present invention.

Referring to FIG. 6, a partial block diagram of an decoder apparatus 120 illustrating an example implementation in accordance with a preferred embodiment of the present invention is shown. The decoder apparatus 120 may be implemented as a video bitstream decoder or system. The decoder apparatus 120 generally comprises a circuit 122, a circuit 124, a circuit 126 and a memory 128. The circuit 122 may receive an input bitstream or signal (e.g., RIN). The circuit 126 may generate an output bitstream or signal (e.g., ROUT).

The circuit 122 may be implemented as a decoder circuit. In one embodiment, the decoder circuit 122 may be implemented as an entropy decoder circuit 122. The entropy decoder circuit 122 may be operational to decode the bitstream signal TOUT generated by the entropy coding circuit 116 (e.g., TOUR=RIN). A decoded bitstream or signal (e.g., RBS) may be presented by the entropy decoder circuit 122 to the circuits 124 and 126.

The circuit 124 may be implemented as a prediction circuit. The prediction circuit 124 may be operational to determine if inter or intra prediction has been implemented for the various macroblocks of the pictures in the signal RBS. The prediction circuit 124 may generate a command signal (e.g., CMD) to the circuit 126 indicating the prediction type.

The circuit 126 may be implemented as a decompression circuit. The decompression circuit 126 may examine the compressed groups to determine how the motion vectors within the groups should be used. The decompression circuit 126 may store and read the motion vectors and associated meaning values in the memory 128 via a signal (e.g., GRP). The motion vectors and meaning values may be used to generate the signal ROUT that may then be subject to motion compensation and/or intra prediction.

The memory 128 may be implemented as a cache memory and/or an external memory. The memory 128 is generally operational to store the motion vectors and respective meaning values for the macroblocks while the macroblocks are being decoded. The memory 128 may be configured to store other data used for decoding the bitstream data. Other types of memories may be implemented to meet the criteria of a particular application.

The various signals of the present invention may be implemented as single-bit or multi-bit signals in a serial and/or parallel configuration. While the invention has been particularly shown and described with reference to the preferred embodiments thereof, it will be understood by those skilled in the art that various changes in form and details may be made without departing from the spirit and scope of the invention.

The invention claimed is:

1. A method for representing a motion for two blocks, comprising the steps of:
    (A) exchanging a group with a memory, said group comprising a parameter and up to two of a plurality of motion vectors, said parameter having (i) a first value which indicates that both of said blocks use an intra prediction (ii) a second value which indicates that both of said blocks use a list 0 prediction, (iii) a third value which indicates that both of said blocks use a list 1 prediction and (iv) a fourth value which indicates that both of said blocks use a bidirectional prediction in which a first of said blocks uses both of said two motion vectors and a second of said blocks uses both of said two motion vector and (2) said exchanging includes at least one of reading from said memory and writing to said memory; and
    (B) representing said motion for said two blocks with said group, wherein said two blocks comprise two 4×4 blocks within a single 8×8 quadrant of a macroblock coded using a macroblock adaptive field/frame coding.

2. The method according to claim 1, wherein (i) said first block has a first of said motion vectors and a second of said motion vectors and (ii) said group has at most one of said first motion vector and said second motion vector.

3. The method according to claim 1, wherein a first plurality of said motion vectors corresponding to said first block matches a second plurality of said motion vectors corresponding to said second block.

4. The method according to claim 3, further comprising the step of:
    excluding said second plurality of said motion vectors from said group.

5. The method according to claim 1, wherein (i) said group includes at most two of said motion vectors and (ii) said parameter comprises at most two bits.

6. The method according to claim 5, wherein said parameter defines how many of said motion vectors are used by said first block.

7. The method according to claim 1, further comprising the step of:
    using said list 0 prediction with said motion vectors, wherein a first of said motion vectors is different than a second of said motion vectors.

8. The method according to claim 1, further comprising the step of:
    using said list 1 prediction with said motion vectors, wherein a first of said motion vectors is different than a second of said motion vectors.

9. The method according to claim 1, further comprising the steps of:
    generating said group with said parameter while above a predetermined H.264 standard level for a bitstream conveying said macroblock; and
    generating said group without said parameter while below said predetermined H.264 standard level for said bitstream.

10. The method according to claim 1, further comprising the steps of:
    interpreting said motion vectors in said group based upon said parameter while above a predetermined H.264 standard level for a bitstream conveying said macroblock; and
    using said motion vectors in said group independently of said parameter while below said predetermined H.264 standard level for said bitstream.

11. An apparatus comprising:
    a memory; and
    a circuit configured to exchange a group with said memory, said group comprising a parameter and up to two of a plurality of motion vectors representing a motion of two blocks, said parameter having (i) a first value which indicates that both of said blocks use an intra prediction (ii) a second value which indicates that both of said blocks use a list 0 prediction, (iii) a third value which indicates that both of said blocks use a list 1 prediction and (iv) a fourth value which indicates that both of said blocks use a bidirectional prediction in which a first of said blocks uses both of said two motion vectors and a second of said blocks uses both of said two motion vector wherein (a) said exchange includes at least one of a read from said memory and a write to said memory and (b) said two blocks comprise two 4×4 blocks within a single 8×8 quadrant of a macroblock coded using a macroblock adaptive field/frame coding.

12. The apparatus according to claim 11, wherein (i) a first of said blocks has a first of said motion vectors and a second of said motion vectors and (ii) said group has at most one of (a) said first motion vector and (b) said second motion vector.

13. The apparatus according to claim 11, wherein (i) said group includes at most two of said motion vectors and (ii) said parameter comprises at most two bits.

14. The apparatus according to claim 13, wherein said parameter defines how many of said motion vectors are used by said first block.

15. The apparatus according to claim 11, further comprising:
a circuit configured to insert said parameter within a bitstream.

16. The apparatus according to claim 11, further comprising:
a circuit configured to parse said parameter from a bitstream.

17. An apparatus comprising:
means for storing a group; and
means for exchanging said group with said means for storing, said group comprising a parameter and up to two of a plurality of motion vectors representing a motion of two blocks, said parameter having (i) a first value which indicates that both of said blocks use an intra prediction (ii) a second value which indicates that both of said blocks use a list 0 prediction, (iii) a third value which indicates that both of said blocks use a list 1 prediction and (iv) a fourth value which indicates that both of said blocks use a bidirectional prediction in which a first of said blocks uses both of said two motion vectors and a second of said blocks uses both of said two motion vector, wherein (a) said exchanging includes at least one of reading from said means for storing and writing to said means for storing and (b) said two blocks comprise two 4×4 blocks within a single 8×8 quadrant of a macroblock coded using a macroblock adaptive field/frame coding.

18. A method for representing a motion for two blocks, comprising the steps of:
(A) generating a representation for said motion for said two blocks, said representation having less than four motion vectors for said two blocks when in a bidirectional prediction mode, wherein a first two of said four motion vectors reference a first reference frame and a second two of said four motion vectors reference a second reference frame; and
(B) exchanging said representation with a memory, wherein (i) said exchanging includes at least one of reading from said memory and writing to said memory and (ii) said two blocks comprise two 4×4 blocks within a single 8×8 quadrant of a macroblock coded using a macroblock adaptive field/frame coding.

19. The method according to claim 18, wherein said representation comprises (i) a particular value of a plurality of values and (ii) up to two of said four motion vectors.

20. The method according to claim 18, wherein (i) a first of said motion vectors corresponding to a first block of said two blocks has one of a first number of possible vectors, (ii) a second of said motion vectors corresponding to said first block has one of a second number of possible vectors, (iii) a third of said motion vectors corresponding to a second block of said two blocks has one of a third number of possible vectors and (iv) a fourth of said motion vectors corresponding to said second block has one of a fourth number of possible vectors.

21. The method according to claim 20, wherein said representation utilizes less than a maximum number of bits, said maximum number of bits matching a base 2 logarithm of a product of said first number, said second number, said third number and said fourth number rounded up to a nearest integer.

22. The method according to claim 18, wherein said representation comprises at most two of said four motion vectors, each of said two motion vectors can take on at least 67,108,864 unique values, and said representation uses fewer than 104 bits.

23. The method according to claim 18, wherein said representation comprises a parameter, said parameter having (i) a first value which indicates that both of said blocks use an intra prediction (ii) a second value which indicates that both of said blocks use a list 0 prediction, (iii) a third value which indicates that both of said blocks use a list 1 prediction and (iv) a fourth value which indicates that both of said blocks use a bidirectional prediction in which a first of said blocks uses a particular two of said four motion vectors and a second of said blocks uses said particular two of said four motion vectors.

24. The method according to claim 23, wherein (i) said representation includes at most two of said four motion vectors and (iii) said parameter comprises at most two bits.

25. The method according to claim 18, wherein (i) a first of said blocks has a first of said four motion vectors and a second of said four motion vectors and (ii) said representation has at most one of (a) said first motion vector and (a) said second motion vector.

* * * * *